No. 751,535.

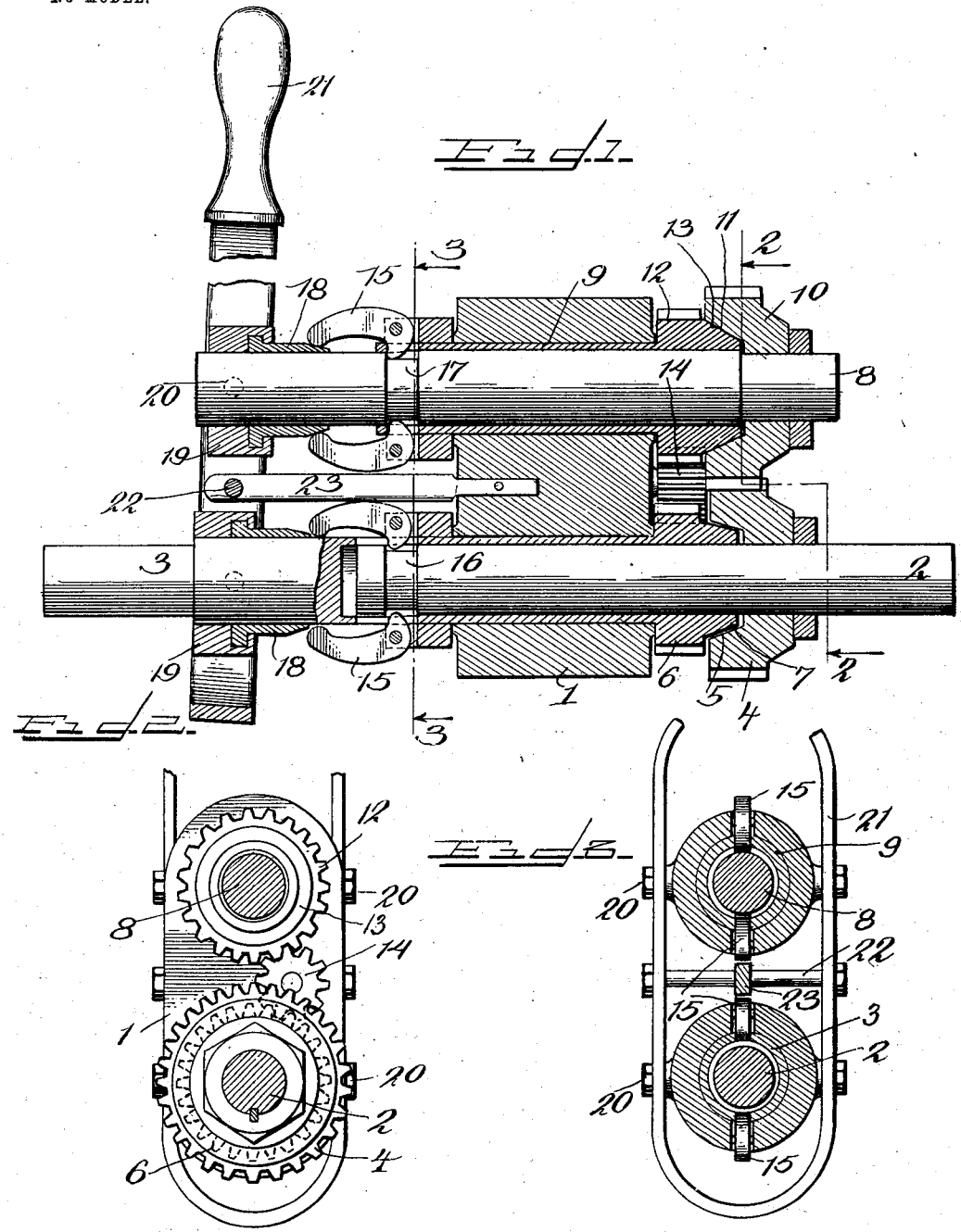

Patented February 9, 1904.

UNITED STATES PATENT OFFICE.

HERMANN J. MOHLENHOFF, OF NEW YORK, N. Y., ASSIGNOR TO GEORGE K. WALLACE, CHARLES D. NEWTON, AND FRED M. SAMES, OF NEW YORK, N. Y.

GEARING.

SPECIFICATION forming part of Letters Patent No. 751,535, dated February 9, 1904.

Application filed February 27, 1903. Serial No. 145,359. (No model.)

*To all whom it may concern:*

Be it known that I, HERMANN J. MOHLENHOFF, a citizen of the United States of America, residing at New York city, county and State of New York, have invented certain new and useful Improvements in Gearing, of which the following is a specification, reference being had to the accompanying drawings, forming a part thereof.

My application relates to improvements in clutch mechanism, and particularly to duplex clutch mechanism connected together by gearing.

The object of my invention is to improve and simplify clutch mechanism and to cause the ready, rapid, and positive engagement of the clutch members and the equally ready and positive release of same in accordance with the movements of the controlling-lever.

The apparatus comprises two clutches connected by certain gearing, and controlled by a single operating-lever, so that in an extreme position in one direction of the said operating-lever the members of one clutch are engaged with each other, while the members of the other clutch are disengaged from each other. In an extreme position of the operating-lever in the opposite direction the relative positions of the clutches are exactly reversed and in an intermediate position of the operating-lever both clutches are disengaged.

My invention further consists in certain details of construction and combination of parts, as will be more fully set forth in the following specification, and other advantages will appear hereinafter.

I will now proceed to describe an apparatus embodying my invention and will then point out the novel features in claims.

In the drawings, Figure 1 is a view in central longitudinal section of an apparatus embodying my invention. Fig. 2 is a view in transverse section thereof, the plane of section being taken upon the line 2 2 of Fig. 1. Fig. 3 is a view in transverse section thereof, the plane of section being taken upon the line 3 3 of Fig. 1.

In the embodiment of my invention herein illustrated a supporting block or bearing is shown at 1. The supporting block or bearing supports a driving-shaft 2 and a driven shaft 3 in alinement with each other. I refer to the shafts 2 and 3 as "driving" and "driven" shafts, respectively, herein for purposes of description. It will be understood, however, that the shaft 3 may equally well be the driving-shaft and the shaft 2 the driven shaft, if desired. The driving-shaft 2 is provided with a primary gear-wheel 4, having a tapered recess 5 therein, so as to form one member of a primary clutch. The driven shaft 3 is sleeved for a portion of its length upon the driving-shaft 2 and is provided with a primary gear-wheel 6, having a tapered hub 7, adapted to coact with the recess 5 and forming the other member of the said primary clutch. The supporting-block also supports a secondary shaft 8 and a secondary sleeve 9. The secondary shaft 8 is provided with a secondary gear-wheel 10, arranged in mesh with the primary gear-wheel 4, recessed at 11 to form one member of a secondary clutch, and the sleeve 9 is provided with a secondary gear-wheel 12, arranged in gear with the secondary gear-wheel 6 through an intermediate idler gear-wheel 14 and having a tapered boss or projection 13 for coaction with the recess 11 and constituting the other member of the said secondary clutch. The sleeve 9 is mounted to rotate freely upon the shaft 8 except when secured thereto by engagement of the secondary clutch members 11 and 13, and the shaft 8 is arranged to have a limited longitudinal movement within the sleeve 9. The sleeve portion of the driven shaft 3 is similarly mounted with respect to the driving-shaft 2, and the said driving-shaft is permitted a limited longitudinal movement with respect thereto. Bell-crank levers 15 are pivotally secured to and carried by the sleeve 9 and the sleeve portion of the driven shaft 3. The driving-shaft 2 is provided with an annular groove 16, and the secondary shaft 8 is provided with a similar annular groove 17. The short arms of the bell-crank levers 15 are arranged to be received within the grooves 16 and 17 and engage the front walls or shoulders thereof. The long arms of the bell-crank levers 15 engage with cones 18, mounted upon the driven shaft 3 and the secondary shaft 8. The cones 18 are mounted upon their respective shafts to revolve therewith, and their flanged ends are received within heads 19, mounted upon their respective shafts 3 and 8, but held against rotation therewith. The heads 19 are provided with trunnions 20, mounted in a yoked portion of the operating-lever 21. The operating-lever 21 is pivotally mounted upon a stud 22, carried by an arm 23, supported by the supporting-block 1, so that the said lever is arranged to rock upon a support intermediate of the shafts 3 and 8. When the parts are in the position shown in Fig. 1 of the drawings, in which position the upper end of the lever 21 is forced inward toward the supporting-block, the cone 18 upon the shaft 8 has engaged the long arms of the respective bell-crank levers 15, so as to force the shaft 8 outwardly in the direction of the arrow thereupon. In the meantime the cone 18 around the driven shaft 3 will have been moved outwardly, so as to disengage the long arms of the bell-crank levers 15 adjacent thereto, and the clutch members 5 and 7 will have been released from engagement. The result of the foregoing arrangement and combination of parts will be that the driving-shaft 2 will transmit motion through the gearing 4, 10, 12, 14, and 6 to the driven shaft 3 in a direction of rotation opposite to that of its own.

If the position of the operating-lever 21 be reversed, so that the members of the secondary clutch 11 13 be released and the members of the primary clutch 5 7 be engaged, motion will then be transmitted directly from the driving to the driven shaft, because the two will be locked together by the primary clutch and the secondary shaft 8 and sleeve 9 will be revolved idly in opposite directions to each other. In an intermediate position of the lever 21 the members of both the primary and the secondary clutch will be disengaged from each other and no motion whatever will be transmitted by the driving-shaft in its rotation to the driven shaft.

By my arrangement and combination of parts I obtain a positive locking and unlocking of the clutch members, as desired, with a minimum movement of the operating-lever 21 and have produced an exceedingly simple, strong, and efficient clutch mechanism.

What I claim is—

1. The combination with a suitable support, of two sets of shafts supported thereby and arranged with parallel axes of rotation, each set comprising two shafts one arranged to rotate within the other and to have a limited longitudinal movement with respect to the other, two clutches comprising each two members, the members of one clutch secured respectively to the shafts of one set, and the members of the other clutch secured respectively to the shafts of the other set, gearing connecting the shafts of one set respectively with the shafts of the other set, bell-crank levers pivotally secured to one shaft of each set and engaging the other shaft thereof, and means for operating the bell-crank levers.

2. The combination with a suitable support, of two shafts supported thereby, one arranged to rotate within the other and to have a limited longitudinal movement with respect to each other, a gear-wheel having a concentric conical recess secured to one of said shafts, another gear-wheel having a concentric conical hub adapted for coaction with the conical recess of the first said gear-wheel, secured to the other said shaft, a train of gearing meshing with said gear-wheels, bell-crank levers pivotally connected to one of said shafts, and in engagement with the other of said shafts, an operating-cone surrounding the central shaft for engaging the bell-crank levers, and a controlling-lever controlling the movements of said operating-cone.

3. The combination with a suitable support, of two sets of shafts supported thereby and arranged with parallel axes of rotation, each set comprising a central shaft and a sleeve-shaft surrounding the same and permitted to have a limited longitudinal movement with respect to each other, two clutch members, one carried by each of said central shafts, two corresponding clutch members, one carried by each of said sleeve-shafts, gearing connecting the corresponding clutch members together, bell-crank levers pivoted respectively to each of said sleeve-shafts and engaging each of said central shafts, cones carried by said shafts for operating said bell-crank levers, and an operating-lever pivotally supported intermediate the two shafts and engaging both said cones.

HERMANN J. MOHLENHOFF.

Witnesses:
RICHARD T. CURRY,
ISAAC NURNBERGER.